United States Patent [19]
Gabriel

[11] Patent Number: 5,113,052
[45] Date of Patent: * May 12, 1992

[54] PROCESS FOR THE OVEN BRAZING OF TWO PIECES IN RARIFIED OR CONTROLLED ATMOSPHERE

[76] Inventor: Marcel Gabriel, Neuilly En Thelle, France

[ * ] Notice: The portion of the term of this patent subsequent to Dec. 12, 2008 has been disclaimed.

[21] Appl. No.: 221,385

[22] Filed: Jun. 17, 1988

[30] Foreign Application Priority Data

Jun. 17, 1987 [FR] France ................. 87 08434

[51] Int. Cl.⁵ ............................. B23K 31/02
[52] U.S. Cl. ................. 219/85.22; 219/85.1; 228/122; 228/124
[58] Field of Search ............... 219/85 M, 85 R, 85 E, 219/85.1, 85.22, 85.13, 85.17; 228/122, 123, 124, 263.12, 226; 428/408

[56] References Cited

U.S. PATENT DOCUMENTS 3,862,488  1/1975  Pessell et al. .................. 29/492
4,621,761  11/1986  Hammond et al. ............ 228/124
4,700,882  10/1987  Devine, Jr. .................... 228/194

Primary Examiner—A. D. Pellinen
Assistant Examiner—David Osborn

[57] ABSTRACT

The brazing process consists in inserting between two pieces to be brazed on the one hand, a plaque or strip of refractory metal such as molybdenum, tantalum, hafnium, zirconium, niobium, tungsten or an alloy including at least one of these elements, and, on the other hand, a plaque or strip of copper, copper alloy, titanium, titanium alloy, nickel or nickel alloy, the contributing metal compound being then placed between the plaques or strips and the two pieces.

10 Claims, 1 Drawing Sheet

PROCESS FOR THE OVEN BRAZING OF TWO PIECES IN RARIFIED OR CONTROLLED ATMOSPHERE

BACKGROUND OF THE INVENTION

1. Field of the Invention

The present invention concerns a process of oven brazing in rarefied or controlled atmosphere of two pieces having very different coefficients of expansion and/or destined to be exposed to high thermic gradients.

2. Description of the Prior Art

In general, we know that in the classical oven brazing technique the pieces to be brazed are first assembled, for example with the aid of annex elements, so that the zones of contact where the brazing is to take place are pressed up against one another in their definitive positions, with the interposition of the contributing metallic compound (brazing metal) which is usually in the form of a thin plaque, brazing wire or paste, depending on the conception of the pieces to be brazed.

This assembled whole is then placed in a thermic treatment oven capable of ensuring the appropriate thermic cycle, during which the two pieces are heated to a high temperature bringing about the fusion of the contributing metallic compound which, in liquid state, can interpenetrate to a certain depth the matter constituting the two pieces around the contact zones. At the end of the cycle, the pieces undergo a cooling phase which brings about the solidification of the contributing metallic compound and the return of the whole to the ambient temperature.

To allow for the nature of the pieces to be brazed and the contributing metallic compound used, this thermic cycle can be carried out in controlled atmosphere or even in vacuum conditions, notably in view of avoiding untimely chemical reactions and, in particular, oxidisation phenomena that might jeopardize the quality of the brazing, this solution having moreover the advantage of doing without the use of a flux.

This technique is quite suitable where the two pieces to be brazed have similar coefficients of expansion. On the other hand, in the case of the two pieces having very different coefficients of expansion, differential expansion phenomena occurring around the junction zone of the two pieces may lead, in particular during the cooling phase, to detachment of the brazing, as well as deteriorations, and even to ruptures of one and/or the other of the two pieces.

Of course, these faults may also become manifest in the case of the two pieces, once brazed, being exposed to high rises in temperature.

Similarly, these phenomena of differential expansion can come into play in the case of two pieces having similar coefficients of expansion being exposed, subsequent to brazing, to different temperatures.

This is notably the case of certain elements used in thermic exchangers that are made of two pieces joined together by brazing, one piece being heated to high temperature while the other is constantly cooled.

OBJECT OF THE INVENTION

More particularly then, the aim of the invention is to do away with these drawbacks, in particular in the case of the brazing of a piece of a material with a low coefficient of expansion such as graphite, a ceramic or even a metal surfaced with a ceramic, and a piece with a high coefficient of expansion, of a metallic or non-metallic material, that may be brazed or be surfaced with a coating enabling brazing, and resisting to the temperature at which the brazing must be carried out, for example a temperature around or upwards of 800° C.

SUMMARY OF THE INVENTION

The invention process consists is inserting, between the junction zones where the brazing is to be done, a thin plaque or strip of a refractory metal such as molybdenum, tantalum, hafnium, zirconium, niobium, tungsten or an alloy including at least one of these elements.

In this case, the contributing metallic compound (brazing metal) is placed between the plaque or strip of refractory metal and the junction zones of the two pieces where the brazing is to be done.

As a result, the aforesaid plaque or strip of refractory metal enables the reconciliation of the thermic constraints between these two pieces. Moreover, since this plaque or strip has a coefficient of expansion intermediate to those of the two pieces, it constitutes a transition zone that reduces the effects of differential expansion between the two pieces.

Furthermore, it constitutes a barrier that enables to avoid the formation of eutectics between the materials constituting the two pieces in the case of a rise in temperature.

Another advantage is that the invention process may comprise a prior surface treatment of the junction zone of the piece having the higher coefficient of expansion.

Thus, the junction zone of the piece having the higher coefficient of expansion may be coated beforehand with a surfacing of copper, for example by physical vapour deposit (PVD) or by means of electrolysis.

This surfacing treatment aims, on the one hand, at increasing the wettability of the brazing on the surface of the pieces to be brazed, and, on the other hand, at protecting the surfaces to be brazed against possible oxidisations that may threaten during the brazing cycle.

In the case of specific applications, a coating such as gold, platinum, palladium, silver, lithium, germanium (or alloys containing these metals) will be used.

One or several plaques or strips of different materials, for example of copper or of titanium, will be inserted between the piece having received the prior surfacing treatment and the plaque(s) or strip(s) of refractory metal.

Because of its malleability, this (or these) plaque(s) or strip(s)—(copper or titanium for example) will serve as a buffer, helping to attenuate the effects of the constraints incumbent on differential expansions.

Of course, the invention also concerns pieces obtained by brazing of at least two elements, in conformity with the invention process.

BRIEF DESCRIPTION OF THE DRAWINGS

Ways of carrying out the invention process will be described hereinafter, to serve as non-restrictive examples, with reference to the annexed drawings, in which.

DESCRIPTION OF THE PREFERRED EMBODIMENTS

Figure 1:
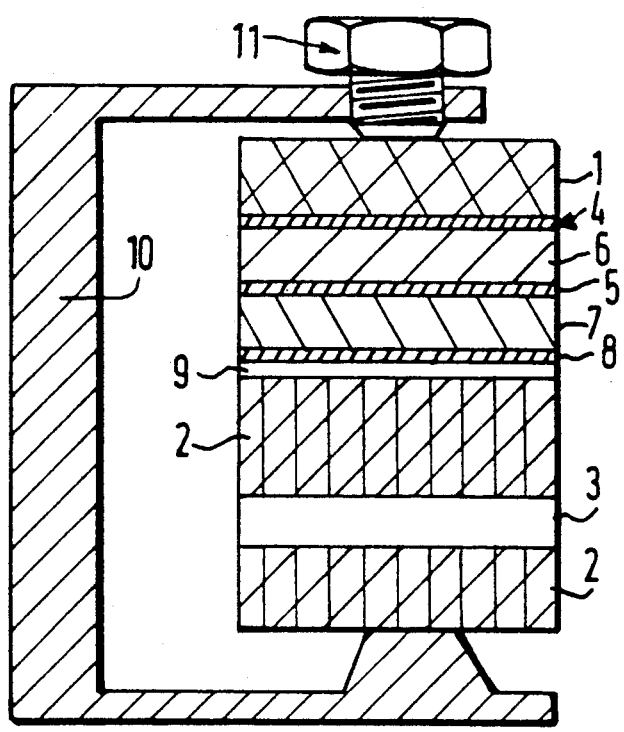
FIG. 1 is a schematic cut showing the positioning of the different elements used in view of brazing the two pieces using one application of the invention process.

In the example shown in FIG. 1, the two pieces to be joined consist of a first piece of graphite 1, which has a very low coefficient of expansion and is destined to be exposed to rises in temperature, for instance under the effect of high power energy rays, and a second metallic piece 2, of stainless steel, fitted with a channel 3 enabling the passage of a cooling fluid. This second piece 2 which, in principle, is constantly cooled, is not destined to be exposed to high rises in temperatures.

The joining of the two pieces by brazing presents a double problem, in effect:

In the course of the brazing, the two pieces 1-2 must necessarily be heated to a relatively high temperatures (around 830° C.) which corresponds to the fusion point of the contributing metallic compound which may, for example, be a brazing metal of the "low silver" type containing copper and titanium. Consequently, in the course of this heating, the stainless steel piece 2 which has a relatively high coefficient of expansion, will expand, while the graphite piece 1 will undergo no dimensional modification. Following this, during the cooling phase in which the brazing returns to the solid state, the stainless steel piece 2 will contract and exert on the graphite piece 1 considerable mechanical constraints (shearing/traction), by the intermediary of the solidified brazing metal. These constraints may reach levels sufficiently high to bring about the rupturing of the graphite piece 1 and/or a partial or total detachment of the two pieces 1-2.

The second problem inherent to this type of joining results from the fact that, during the actual utilisation of the whole once brazed, in spite of its being constantly cooled, the stainless steel piece 2 will be exposed to heating at least around the zone of junction with the graphite piece 1, and precisely there where the brazing has taken place. This heating will cause expansion phenomena in the stainless steel piece 2, at least around the same zones, which in turn will lead to the same faults as described previously.

Added to these two problems are those resulting from the fact that around the junction zones there is the risk of the forming of eutectic mixtures, notably between the iron present in the stainless steel and the graphite, as well as the risk of oxidisations, notably of the chrome present in the stainless steel. It is obvious that the forming of these eutectic mixtures and of these oxides may considerably alter the quality of the brazing.

As was mentioned previously, the invention process enables the elimination of these drawbacks.

The process consists in interposing between the two pieces 1-2 to be brazed, a plaque or strip 6 of refractory metal, in this case a plaque of molybdenum 6, and a plaque or strip of metal, in this case a plaque of copper 7, which will serve, on the one hand, to reconcile the constraints exerted between the two pieces, notably during the brazing, and following this will ensure on the other hand the diminishing of heating around the junction zone of the stainless steel piece (FIG. 1).

Of course, between the plaque 6 and the graphite piece 1 as well as between the molybdenum plaque 6 and the copper plaque 7, and similarly between this last-named plaque 7 and the stainless steel piece 2 surfaced with a coating of copper 9, are inserted the brazing metal plaques numbered respectively 4, 5 8. (FIG. 1).

Apart from this, the zones of junction of the two pieces 1-2 may receive appropriate surfacing treatments.

In this way, the stainless steel piece 2 may notably undergo a copper coating 9 treatment by electrolysis or by PVD deposit, which apart from its compatibility with brazing (improvement of the brazing metal's wettability) will constitute a "chemical"barrier to avoid the oxidisation of the stainless steel (oxide of chrome in particular).

As a further improvement, the brazing of the two pieces 1-2 will be carried out under pressure so as to improve the diffusion of the brazing metal into the graphite, which has a certain porosity.

This pressure can be exerted for example by means of a screw 11 press 10 of a type such as that shown in FIG. 1. The tightening torque will be calculated according to the nature of the materials used and their rate of porosity.

The whole formed by pieces 1-2, pre-assembled and held together under pressure, with the prior interposition of the molybdenum 6 and copper 7 plaques and of the three strips of contributing metallic compound or brazing metal 4, 5 and 8 (as shown in FIG. 1) is placed in a thermic treatment oven under vacuum conditions; in order to undergo the thermic cycle bringing about the brazing.

Figure 3:
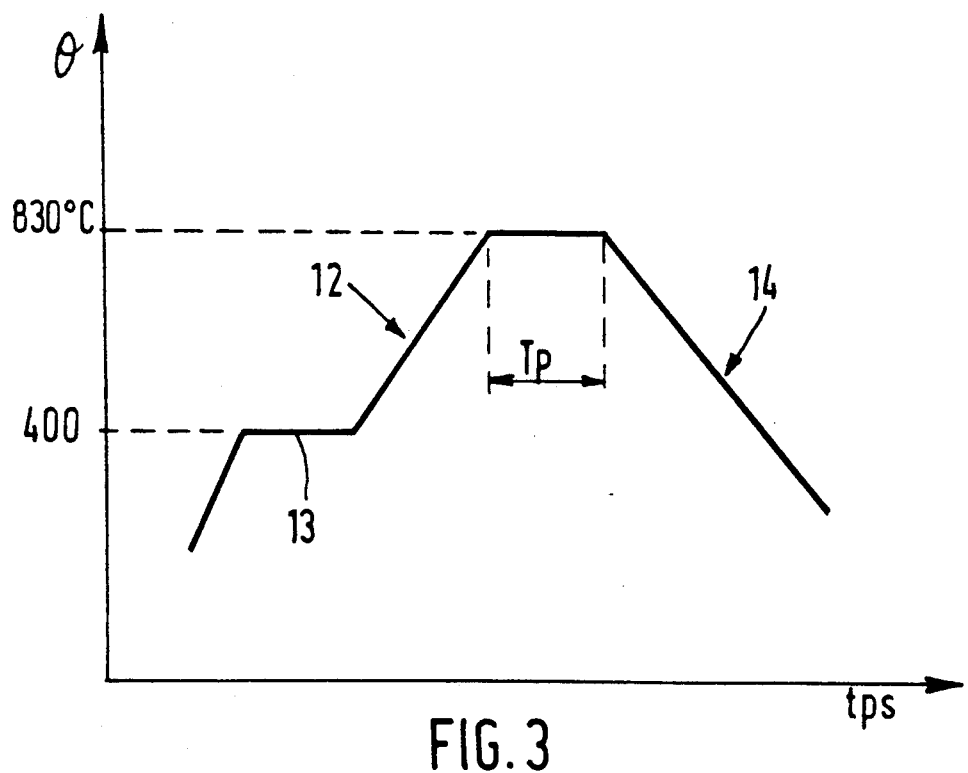
FIG. 3 is a representative diagram of the temperature of an oven with regards to time, in the course of a brazing cycle.

As can be seen in FIG. 3, this cycle comprises first of all a temperature increase phase 12, preferably including a homogenisation level 13 at around 400° C. This temperature increase phase continues until a temperature of around 830° C. is attained, a temperature which corresponds to the fusion point of the brazing metal. Once this temperature is reached, it is stabilised and held constant for a length of time Tp determined according to the depth of diffusion of the brazing metal into the graphite that is desired (more generally, this length of time depends on the porosity and the massiveness of the pieces to be brazed).

In this way, in the example illustrated in FIG. 1, this length of time may last about one hour in the case where the piece of graphite 1 is in the shape of a parallelepiped, the length and breadth of which are around 100 mm, and whose thickness is around 300 mm.

The last phase of the cycle is a cooling phase 14 which may vary in duration in consideration of the application.

The invention is not limited to the way of carrying out the process previously described.

Figure 2:
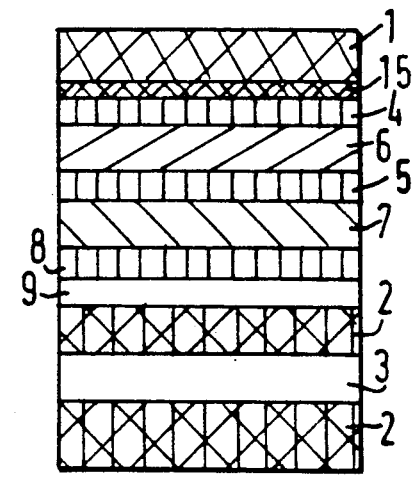
FIG. 2 is a schematic cut illustrating a variation of the positioning represented in FIG. 1.

Thus, as is shown in FIG. 2, the graphite piece 1 may be surfaced with a ceramic coating 15, for example of nitrure of titanium TiN, of aluminium $Al_2O_3$ or of zircon $ZrO_2$.

The molybdenum plaque 6 may be replaced by a plaque made of a refractory metal or metallic alloy including or consisting of tantalum, hafnium, zirconium, niobium or tungsten.

Similarly, the copper plaque 7 may be replaced by a plaque made of copper alloy, bronze, or even titanium.

As was previously mentioned, piece 2 may be made of a metallic or non-metallic material, and may be surfaced with a coating 9 able to absorb brazing metal, for example a coating of ceramic, of metal or of an alloy obtained by any surfacing technique (physical vapour phase deposit, eletrolytic deposit, chemical vapour phase deposit, plasma spread, . . . ).

For common applications, this coating 9 may be of copper or of nickel electrolytically deposited or deposited by physical vapour (PVD). For more specific applications, this coating may be of silver, of gold, or germanium, of lithium, of palladium, of platinum or of an alloy including at least one of these elements.

Apart from this, in certain applications it will be possible to interpose between the two pieces to be brazed 1 and 2 only the plaque or stip of refractory metal 6 with interposition between this plaque 6 and pieces 1 and 2 of two plaques of brazing metal.

I claim:

1. Process for brazing first and second pieces, said first piece having a coefficient of expansion lower than that of the second piece, so as to obtain a brazed structure wherein the first piece can be heated at a high temperature while the second piece is constantly cooled, said process comprising the following steps of
   i—interposing between the pieces an assembly comprising at least a first plaque of brazing compound, a plaque of refractory metal, a second plaque of brazing compound, a plaque of thermally conducting metal and a third plaque of brazing compound, the plaque of refractory metal being placed between the first piece and the plaque of thermally conducting metal;
   ii—pre-assembling and holding the assembly pressed between the pieces;
   iii—placing the pieces and the assembly, once pre-assembled, in a thermic treatment oven under vacuum conditions;
   iv—effecting in the oven a thermic cycle which comprises a heating phase which is continued until the pieces and the assembly are elevated to a temperature which corresponds to a fusion point of the brazing compound, a diffusion phase wherein the temperature is maintained substantially constant, and a cooling phase;
   v—extracting the pieces from the oven after the cooling phase.

2. Process according to claim 1, wherein the said refractory metal consists in one of the following metals:
   molybdenum
   tantalum
   hafnium
   zirconium
   niobium
   tungsten.

3. Process according to claim 1 wherein the said refractory metal consists of an alloy containing at least one of the following metals:
   molybdenum
   tantalum
   hafnium
   zirconium
   niobium
   tungsten.

4. Process according to claim 1, wherein the said thermally conducting metal consists in one of the following metals:
   copper
   titanium
   nickel.

5. Process according to claim 1, wherein the said thermally conducting metal consists in an alloy containing at least one of the followings metals:
   copper
   titanium
   nickel.

6. Process according to claim 1, wherein the said first piece is made of graphite.

7. Process according to claim 1, wherein the said first piece is made of ceramic.

8. Process according to claim 1, wherein the said first piece is surfaced with at least one coating allowing absorption of metal.

9. Process according to claim 1, wherein the second piece has a brazing surface which is covered by a coating deposited by physical vapour deposit.

10. Process as claimed in claim 9, wherein said coating comprises one of the following constituents:
    copper
    nickel
    silver
    gold
    germanium
    lithium
    palladium
    platinium.

* * * * *